April 8, 1958

P. F. SOUTHWICK ET AL 2,830,266

METHOD OF AND APPARATUS FOR MEASURING
MUD FILTER CAKE RESISTIVITY

Filed June 1, 1954

INVENTORS.
Peter F. Southwick and
Malcolm R. J. Wyllie.
BY
ATTORNEY.

United States Patent Office 2,830,266
Patented Apr. 8, 1958

2,830,266

METHOD OF AND APPARATUS FOR MEASURING MUD FILTER CAKE RESISTIVITY

Peter F. Southwick and Malcolm R. J. Wyllie, Indiana Township, Allegheny County, Pa., assignors to Gulf Research & Development Company, Pittsburgh, Pa., a corporation of Delaware Application June 1, 1954, Serial No. 433,506

16 Claims. (Cl. 324—65)

This invention relates to a method of and apparatus for obtaining specimens of and measuring properties of drilling fluid components. More specifically, this invention pertains to a method of and apparatus for filtering drilling fluid within a borehole and obtaining a specimen of filter cake, and subsequently measuring the thickness and/or electrical properties of such filter cake. A specimen of filtrate which can be used for testing, if desired, is also obtained during the practice of the invention.

Broadly, the invention comprises lowering into a borehole a housing that includes a permeable wall, so that under the influence of the hydrostatic pressure prevailing in the drilling fluid, a portion of the liquid content of the drilling fluid will be filtered through the permeable wall so as to deposit filter cake thereon. The permeable wall preferably includes at least two portions that are angularly inclined to each other, so that on removal of the housing from the borehole, a member complementary to the inclined portions of the permeable wall can be used in measuring the thickness of the filter cake deposited on such portions of the permeable wall. The thickness of the filter cake can be computed from the displacement of the above-mentioned member from a position contacting the inclined portions of the permeable wall to a position contacting the deposits of filter cake on such portions of the permeable wall, upon taking into account the geometrical relationships between the inclined portions of the permeable wall.

Furthermore, the permeable wall as well as the above-mentioned member is formed of electrically conductive materials, so that when the above-mentioned member is positioned so as to measure the thickness of the filter cake, the electrical resistance of the filter cake can be measured.

Preferably, the surface areas of the permeable wall portions are minimized with a view towards facilitating filter cake resistivity measurements. Minimizing such surface areas usually increases the accuracy of resistance measurements, it being noted that very low electrolytic resistances are ordinarily more difficult to measure accurately by conventional means.

The measurements obtained as indicated above, namely, filter cake thickness and the electrical resistivity thereof, are of particularly great value in the quantitative interpretation of electric logs, and particularly logs made by contact resistivity logging devices, with a view toward determining the porosity of formations penetrated by a borehole. Such measurements facilitate ascertainment of the functional relation between the electrical parameter which the logging device measures and the characteristics of the earth formations (particularly porosity).

The invention will be fully understood in the light of the following description and explanation of the use of the preferred embodiment of the invention illustrated in the accompanying drawings, wherein.

Figure 1:
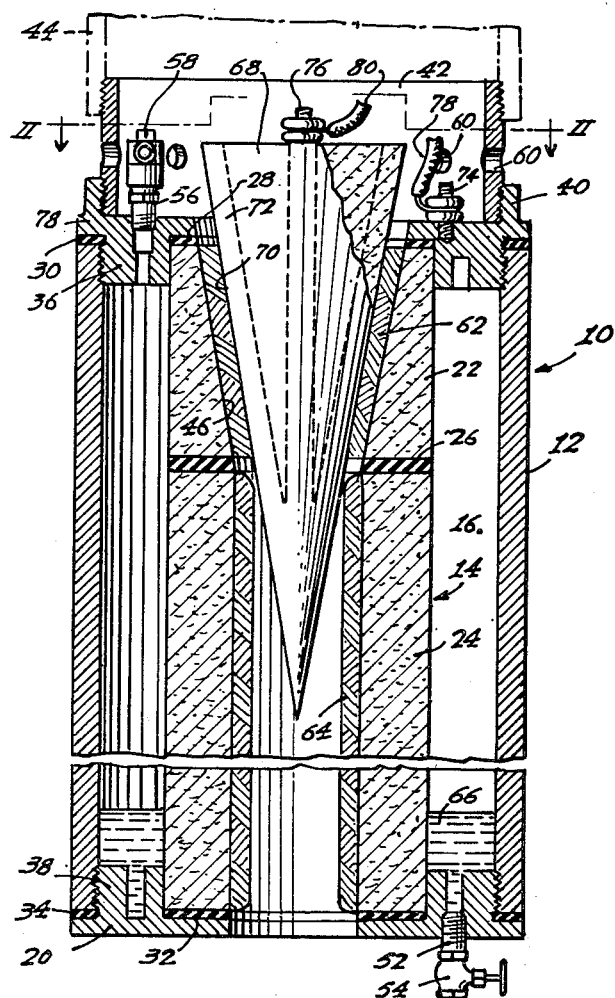
Figure 1 is a broken, central, vertical sectional view of the housing with filter cake deposited thereon, together with the complementary measuring element being shown in operative position. The complementary measuring element is shown principally in elevation with hidden portions thereof being shown in broken lines, and in addition, means for suspending the housing is shown in dashed lines.

Referring to Figure 1, a housing is designated generally at 10, such housing comprising an outer impervious casing or shell 12 and a spaced inner permeable wall designated generally at 14, with the annular space or chamber 16 intermediate the casing 12 and the wall 14 being closed at its upper and lower ends by annular rings 18 and 20, respectively.

The inner wall 14 is of hollow, generally cylindrical configuration and is formed of upper and lower sections 22 and 24, respectively, that are separated by a sealing gasket 26 formed of an electrically nonconductive material. Sealing gaskets 28 and 30, and 32 and 34 are seated between the rings 18 and 20 and the adjacent extremities of the casing 12 and the inner wall 14. The rings 18 and 20 include integral portions 36 and 38, respectively, that extend for a short distance into the annular space intermediate the casing 12 and the inner wall 14, the opposite extremities of the casing 12 being threaded upon such portions 36 and 38 so as to hold the above-described assemblage of elements in assembled relation.

The ring 18 is provided with an integral upstanding internally threaded flange 40 into which a nipple 42 is removably threaded. The nipple 42 constitutes means for detachably securing the housing 10 to any suitable form of supporting means such as is shown in dashed lines and designated by the numeral 44. The supporting means 44 constitutes, as will be understood, a portion of apparatus (not shown) for raising and lowering the housing 10 in a borehole containing drilling fluid. Such apparatus for raising and lowering the housing 10 within a borehole is not illustrated nor described for the reason that such description is not necessary for a full and complete understanding of the invention.

The upper section 22 of the inner wall 14 and preferably also the lower section 24 of the inner wall 14 are formed of a permeable material, such as sintered metal, that is also electrically conductive. The sections 22 and 24 of the inner wall 14 can be formed of such materials as sintered stainless steel, brass, or bronze. The purpose of the inner wall 14 is to serve as a filter for drilling fluids, and for this reason the previous sections thereof should have permeabilities of about 1 to about 1000 millidarcys; however, permeabilities outside such preferred range can be used so long as the permeability is such that filtration of a conventional drilling fluid can be effected therewith. As soon as a thin layer of filter cake is built up or deposited on the surface of the inner wall 14 in a manner to be presently described, the permeability of the filter cake layer will be relatively more important than the permeability of the inner wall 14 since drilling fluid filter cakes commonly have permeabilities in the neighborhood of $10^{-3}$ to $10^{-4}$ millidarcys.

As will become apparent subsequently, the reason that the wall section 22 is preferably electrically conductive is that such construction facilitates making electrical measurements relative to filter cakes deposited thereon.

Figure 2:
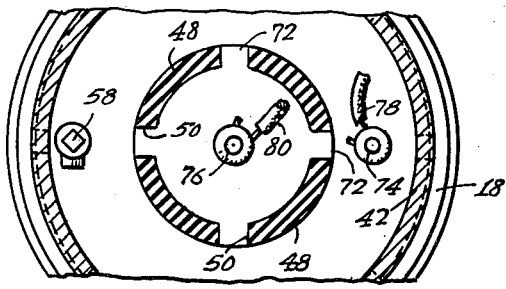
Figure 2 is a fragmentary sectional view taken upon the plane of the broken section, line 2—2, shown in Figure 1.

While the internal and external surfaces of the wall section 24 and also the external surface of the wall section 22 are cylindrical in shape, the wall section 22 has an inner surface 46 that is of frusto-conical configuration. In the preferred construction and for a purpose that will be presently explained, there is secured to the inner surface 46 of the wall section 22 a sectional barrier wall 48 (see Figure 2) formed of an impervious, electrically nonconductive material such as rubber, Bakelite, etc. The barrier wall 48 is of uniform thickness and is provided with a plurality of circumferentially spaced, axially extending keyways 50 that extend through the entire thickness of the barrier wall 48 so as to expose portions of the surface 46. In the preferred form of the barrier wall 48, the same is provided with four keyways 50, as shown, which in effect divide the barrier wall 48 into four separate parts, as will be apparent.

A conduit 52 opens through the annular ring 20 for communicating between the lower portion of the chamber 16 and the exterior of the housing 10, such conduit being provided with a manual valve 54 for opening and closing the same. In addition, communication between the upper portion of the chamber 16 and the exterior of the housing 10 is provided by a conduit 56 that opens through the annular ring 18, the conduit 56 being provided with a check valve 58 that permits only unidirectional flow through the conduit 56. The arrangement is such that when pressure within the chamber 16 appreciably exceeds the pressure ambient to the housing 10, the valve 58 will permit fluid to be discharged from the chamber 16 through the conduit 56.

In operation, the housing 10 is lowered in the drilling fluid within a borehole by appropriate manipulation of the supporting means 44, the chamber 16 initially containing air at atmospheric pressure with the valved conduit 52 being closed. Under such circumstances, the drilling fluid will not only surround the exterior of the housing 10, but will also fill the space inside the inner wall 14, it being noted that the nipple 42 is provided with spaced apertures 60 that facilitate the free flow of drilling fluid into the space within the wall 14. A pressure differential of the pressure in the ambient drilling fluid over the pressure within the chamber 16 will exist by virtue of the hydrostatic pressure prevailing within the drilling fluid, and under the influence of such pressure differential drilling fluid will be filtered through the permeable sections 22 and 24 so as to form filter cakes 62 and 64 upon the inner surfaces thereof, respectively. While the filter cakes 62 and 64 are disposed on the inner wall 14, filtrate passing through the inner wall 14 is collected in the chamber 16 as indicated at 66.

After the housing 10 has been immersed in the drilling fluid for sufficient time for the deposition of the filter cakes 62 and 64 thereon, the housing 10 is then withdrawn from the borehole by suitable manipulation of the supporting means 44. Inasmuch as the pressure within the chamber 16 will have been increased above atmospheric pressure by the ingress of filtrate 66 thereinto, the check valve 58 will prevent the pressure within the chamber 16 exceeding the pressure ambient to the housing 10 by an appreciable differential, upon raising the housing 10, by allowing fluids in the chamber 16 to escape. Such function of the check valve 58 will prevent any flow of fluids from the chamber 16 through the inner wall 14 which would damage the filter cakes 62 and 64 and waste the collected filtrate 66. It will be noted that whatever fluids leave the chamber 16 through the check valve 58 are such as are disposed within the upper portion of the chamber 16 and will therefore consist principally, if not entirely, of air, thereby conserving the collected filtrate 66 for subsequent removal and testing.

Means is provided whereby the thickness of the filter cake 60, as well as its electrical resistivity, can be measured. Such means comprises a male member 68 having an external surface 70 that is complementary to the joint, exposed, internal configuration of the wall section 22 and the barrier wall 48. More specifically, the male member 68 is a substantially conical body being cut away upon its sides so as to accommodate the sections of the barrier wall 48 and thereby define what may be referred to as splines or keys 72 that are complementary to the keyways 50 in the barrier wall 48.

The male member 68 can be formed of any electrically conductive material and through the same can be of impervious character, it is preferred that the same be constituted of permeable material, such as sintered stainless steel, bronze or brass. It is also preferred that the male member 68 have a permeability substantially in excess of that needed for the inner wall sections 22 and 24, say in the neighborhood of about 10 to about 100 darcys.

The male member 68 is inserted into the center of the housing 10 until further inward movement is firmly resisted by the male member 68 contacting the filter cake 62 whereupon the position of the male member 68 is then compared to the position occupied by the male member 68 when no filter cake is present and the splines 72 contact the surface 46. Measurement of the displacement of the male member 68 between such positions affords a basis for computing the thickness of the filter cake 62 by taking into account the apical angle of the cone-shaped male member 68. Specifically, the thickness of the filter cake 62 is equal to the axial displacement between such two positions multiplied by the sine of one-half the apical angle.

It will be noted that where the male member 68 is of pervious or permeable character, as preferred, proper seating or contact of the male member 68 with the filter cake 62 is facilitated by the fact that excess drilling fluid adhering to the true filter cake 62 can be readily displaced as the same will pass into the male member 68.

While the male member 68 is positioned as described above for measuring the filter cake thickness (see Figure 1), the electrical resistivity of the filter cake 62 can also be measured. For this purpose, terminal binding posts 74 and 76 are secured to the annular ring 18 and the male member 68, respectively. The posts 74 and 76 can be connected by electrical leads 78 and 80 to conventional electrical resistance measuring equipment not shown, such as a Wheatstone circuit, etc.

The electrical path between the terminal posts 74 and 76 consists of the post 74, the annular ring 18, which is metallic, the wall section 22, the filter cake 62, the male member 68, and the post 76. The electrical resistance of such a path is essentially a function of the resistivity and thickness of the filter cake 62 and the slant height of the wall section 22. The resistivity of the filter cake 62 can be readily computed from the measured resistance upon taking into account the geometry of the wall section 22, the barrier wall 48, and the male member 68.

Inasmuch as it is normally difficult to measure low resistances accurately, it will be understood that the barrier wall 48 serves the useful function of restricting the cross section of the electrical path through the filter cake 62, and thereby increases the measured electrical resistance.

The filtrate 66 can be removed from the housing by opening the valve 54, and its properties measured as desired, such as in a standard resistivity measuring cell, not shown.

After the thickness and electrical resistance of the filter cake 62 have been measured, the male member 68 is removed and the filter cakes 62 and 64 are flushed from the inner wall 14 by forcing water into the chamber 16 through the conduit 52, while stopping the discharge of water from the valve 58. After sufficient water has flowed through the wall 14 to clean the latter of the filter cakes, the chamber 16 is drained through the conduit 52. The apparatus is then dried by forcing air into the chamber 16 while preventing air from escaping through the valve 58. After the valve 54 is closed, the housing 10 is ready for reuse.

The preferred embodiment of the invention illustrated and described is subject to numerous variations without departing from the spirit of the invention. For example, the permeable wall upon which the filter cake is deposited can constitute an externally tapered outer wall of a hollow housing, in which case the measuring element would be a complementary female-shaped member. Furthermore, other shapes than cones or portions of cones are possible for the wall section 22 and the male member 68, such as wedge shapes; however, the cone configuration is much preferred for ease of fabrication and ready measurement and computation of filter cake thickness.

While the male member 68 has been described as being a solid body, neglecting the porous nature thereof, it is not necessarily so. A useful modification (not shown) of the male member 68 comprises a pervious, hollow metallic shell having the same shape as the external surface of the illustrated male member 68. Such metallic shell can be either perforated sheet metal or metal gauze.

Although the housing 10 may be manipulated in a borehole by itself, it is preferred that the housing 10 be simply suspended from a conventional logging sonde (not shown) during logging. This results in considerable time saving and convenience, and assures that the properties of the filter cake 62 and the filtrate 66 are properly to be associated with the electric log obtained.

The preferred embodiment of the invention has been described in considerable detail in order to convey a full and complete understanding of the principles of the invention, and any implication of narrowness of invention scope is not to be inferred. Rather, the actual scope of the invention should be ascertained from the appended claims.

We claim:

1. The process comprising immersing a hollow housing including a permeable, electrically-conductive wall in drilling fluid within a borehole a sufficient depth for hydrostatic pressure to cause filtration of the drilling fluid through and the deposit of a filter cake on the permeable wall, removing the housing from the drilling fluid, and placing an electrically-conductive member against the exposed surface of the filter cake.

2. The process comprising immersing a hollow housing including a tapered, permeable wall in drilling fluid within a borehole a sufficient depth for hydrostatic pressure to cause filtration of the drilling fluid through and the deposit of a filter cake on the tapered permeable wall, removing the housing from the drilling fluid, and placing a body having a surface complementary to the tapered, permeable wall in contact with the exposed surface of the filter cake.

3. The process comprising immersing a hollow housing including a tapered, electrically-conductive, permeable wall in drilling fluid within a borehole a sufficient depth for hydrostatic pressure to cause filtration of the drilling fluid through and the deposit of a filter cake on the permeable wall, removing the housing from the drilling fluid, and placing an electrically-conductive member having a surface complementary to the tapered, permeable wall in contact with the exposed surface of the filter cake.

4. A measuring device comprising a hollow housing including a permeable wall having a tapered external surface, and a body movable relative to the housing and cooperating therewith having an external surface substantially complementary to the tapered, permeable wall for selectively engaging filter cake deposited on the tapered external surface of the permeable wall.

5. A measuring device comprising a hollow housing including an electrically-conductive permeable wall, said housing being adapted to be immersed in drilling fluid within a borehole for depositing a filter cake on the external surface of the permeable wall, and electrically-conductive means movable relative to the housing having a surface substantially complementary to the external surface of the permeable wall for selectively engaging a filter cake on the permeable wall, said electrically-conductive means being electrically isolated from the housing.

6. The combination of claim 5, including conduit and check valve means communicating between the interior and the exterior of the housing for permitting only outward fluid flow from the interior of the housing.

7. The combination of claim 4, wherein both said wall and said body are electrically conductive and electrically isolated from each other.

8. The combination of claim 4, including check valve means communicating with the upper portion of the interior of the housing for permitting only outward fluid therefrom.

9. A measuring device comprising a hollow housing including a reentrant wall portion that is electrically conductive, said wall portion being permeable and having an outer surface that is of frusto-conical configuration, and an electrically conductive body selectively positionable within and having surface portions that are complementary to the outer surface of said wall portion for selectively engaging a filter cake disposed thereon, said body being electrically isolated from said wall portion.

10. A measuring device comprising a hollow housing including a reentrant wall portion, said wall portion being permeable and having an outer surface that is of frusto-conical configuration, a barrier wall complementary to and secured to said outer surface of the wall portion, said barrier wall having keyways therethrough, and a body cooperating therewith having surface portions that are complementary to the outer surface of said wall portion and splines that are complementary to the keyways.

11. The combination of claim 10, wherein the wall portion and the body are electrically conductive, with the barrier wall being electrically nonconductive.

12. A measuring device comprising an upright cylindrical casing, an annular inner wall disposed within and spaced from the casing, upper and lower annular rings in sealing engagement with the upper and lower end portions of the casing and the inner wall, respectively, to define an annular chamber between the casing and the inner wall, said inner wall being permeable and having an exposed frusto-conical surface, a valved conduit communicating through the lower annular ring with the lower portion of the chamber, and a conduit provided with a check valve communicating with the upper portion of the chamber for relieving excessive pressure within the chamber 13. A measuring device comprising an upright cylindrical casing, an annular inner wall disposed within and spaced from the casing, upper and lower annular rings in sealing engagement with the upper and lower end portions of the casing and the inner wall, respectively, to define an annular chamber between the casing and the inner wall, said inner wall being permeable and having an exposed frusto-conical surface, a valved conduit communicating through the lower annular ring with the lower portion of the chamber, and a conduit provided with a check valve communicating through the upper annular ring with the upper portion of the chamber for relieving excessive pressure within the chamber.

14. The combination of claim 12, wherein the upper and lower annular rings include portions that project between and are in engagement with the casing and the inner wall, said portions each being in threaded engagement with the casing.

15. A measuring device comprising an upright cylindrical casing, an annular inner wall disposed within and spaced from the casing, upper and lower annular rings in sealing engagement with the upper and lower end portions of the casing and the inner wall, respectively, to define an annular chamber between the casing and the inner wall, said inner wall comprising an upper section and a lower section separated by an electrically-nonconductive sealing gasket, said upper annular ring being electrically conductive, said upper and lower sections of the inner wall being permeable and electrically conductive, with the exposed surface of the upper section of the inner wall being of frusto-conical configuration, a valved conduit communicating through the lower annular ring with the lower portion of the chamber, and a conduit provided with a check valve communicating with the upper portion of the chamber.

16. The combination of claim 15 including a barrier wall on the exposed frusto-conical surface of the upper section of the inner wall, said barrier wall being impervious and electrically nonconductive, said barrier wall also having a plurality of keyways therein that expose the inner wall.

References Cited in the file of this patent
UNITED STATES PATENTS

| | | |
|---|---|---|
| 722,632 | Rothe | Mar. 10, 1903 |
| 1,855,904 | Brown et al. | Apr. 26, 1932 |
| 2,218,533 | Huebotter | Oct. 22, 1940 |
| 2,247,040 | Whitsett | June 24, 1941 |
| 2,359,386 | Reinsch | Oct. 3, 1944 |
| 2,569,625 | Wyllie | Oct. 2, 1951 |
| 2,600,150 | Abendroth | June 10, 1952 |